June 9, 1959
H. M. SCHLICKE
2,890,422
ELECTRICALLY RESONANT DIELECTRIC BODY
Filed Jan. 26, 1953
2 Sheets-Sheet 1
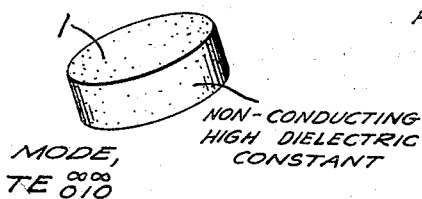
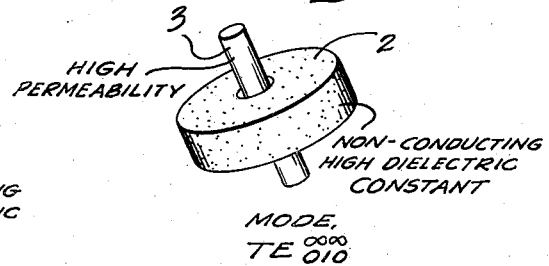
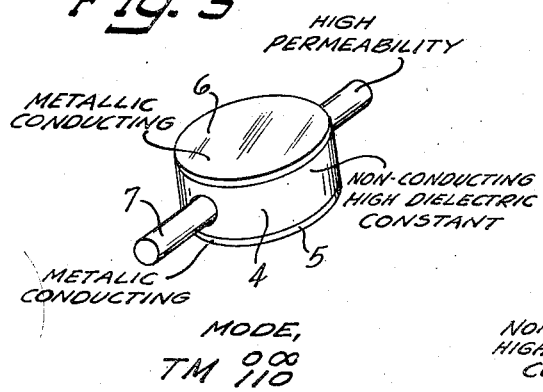
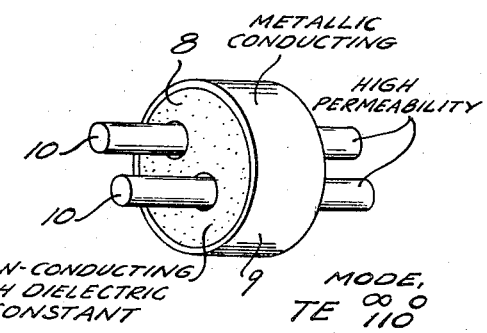
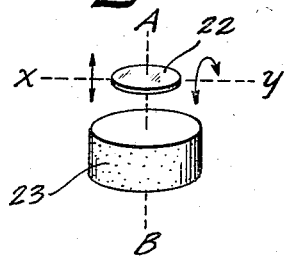
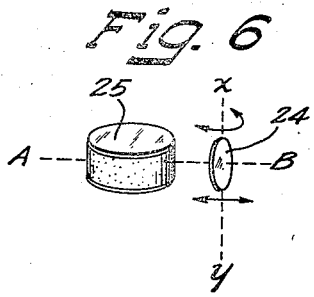
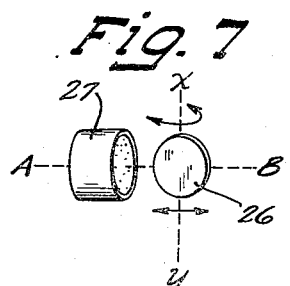
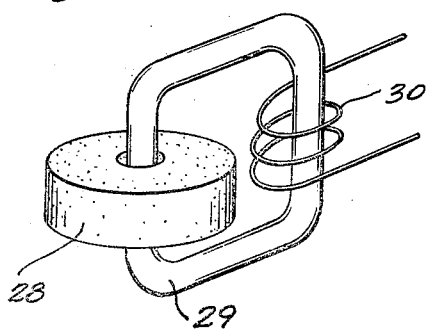
INVENTOR.
Heinz M. Schlicke
BY
David A. Fox
Attorney June 9, 1959 H. M. SCHLICKE 2,890,422
ELECTRICALLY RESONANT DIELECTRIC BODY
Filed Jan. 26, 1953 2 Sheets-Sheet 2
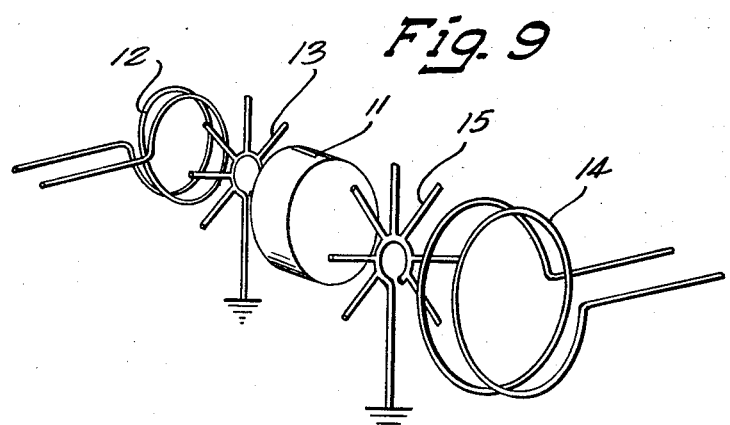
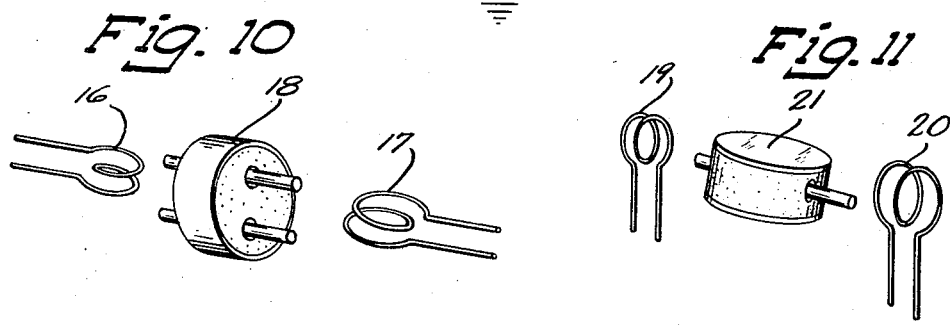
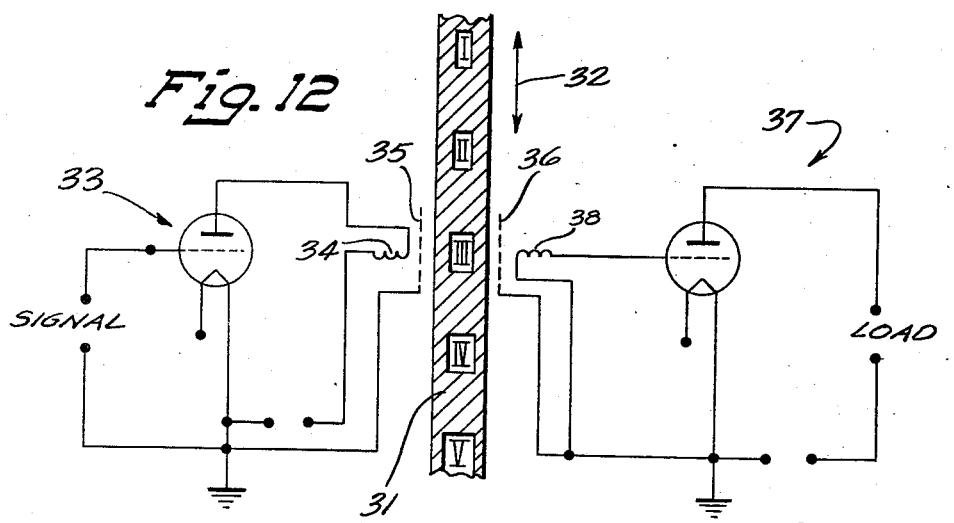
INVENTOR.
Heinz M. Schlicke
BY
David A. Fox
Attorney

United States Patent Office 2,890,422
Patented June 9, 1959

2,890,422

ELECTRICALLY RESONANT DIELECTRIC BODY

Heinz M. Schlicke, Fox Point, Wis., assignor to Allen-Bradley Company, Milwaukee, Wis., a corporation of Wisconsin Application January 26, 1953, Serial No. 333,325

8 Claims. (Cl. 333—77)

This invention relates to apparatus which is resonant with respect to electrical oscillations, which apparatus gives practical utility to certain properties of high dielectric substances.

Whenever a displacement current occurs in a dielectric, the magnetic field, which becomes established as a result thereof, is effective upon cessation of the displacement current to induce upon its collapse a displacement current of opposite sign. This action may give rise to a mechanism tending to induce an oscillatory interchange of electric and magnetic energy, providing losses are sufficiently reduced. An effect dependent upon the foregoing is manifested under certain conditions which may be generally stated as follows: For every discrete body of dielectric, delimited at least in part by isolated naked surfaces constituting an abrupt transition in dielectric constant of sufficient magnitude to ensure a high value of internal reflection, there are inherent modes of electrical resonance.

The apparatus of this invention in its several forms constitutes novel resonators comprising a body of dielectric substance having high dielectric constant and low dielectric loss, delimited in substantial part by naked surfaces, and having an inherent periodicity of electrical resonance.

It is one object of the present invention to provide a tuned electrical instrumentality, resonantly responsive to specific electrical frequencies and to provide such in a form greatly compact with respect to tuned cavities completely bounded by metallic surfaces heretofore employed for the purpose, and simplified with respect to the tuned "tank" circuits made up of inductive windings and capacitors heretofore employed for such purposes.

The frequency of resonant response of the apparatus of this invention is dependent, among other factors, upon the shape, dimensions and location of metallic conducting elements and elements of increased permeability, and also upon the manner of application of driving energy, all of which may influence the mode in which oscillation occurs. A further essential factor, determining the resonant frequency, is the dielectric constant of the body forming the resonators, which dielectric constant must substantially exceed that of the surrounding environment.

Heretofore, delimited-space tuned-resonators have been provided, responsive chiefly to so-called microwave frequencies. These resonators have been termed cavities since they have consisted of a complete surrounding metallic enclosure, usually cylindrical in shape and one half wave length in axial extent. For frequencies of the order of 200 megacycles and less such cavities are inordinately bulky but there has, heretofore, been no compact substitute other than tuned tank circuits composed of inductive windings in circuit with capacitors. It is the discovery of this invention that a delimited-space tuned-resonator may be constructed by employing to advantage the high values of internal reflection of electro-magnetic waves when the same encounter a sharp transition from a high dielectric constant to a low one. Where such a transition is from a dielectric constant of about 10 or more to a constant of about 2 or less there is total internal reflection with angles of incidence as low as 5 degrees.

This invention is herein described by reference to the accompanying drawings forming a part hereof, in which there are set forth by way of illustration and not of limitation specific forms in which this invention may be embodied.

In the drawings:

Fig. 1 is a perspective view of a resonator of this invention in which the oscillation mode may be designated by the symbol $$TE_{010}^{\infty\infty}$$

Fig. 2 is a perspective view of another resonator of this invention in which the oscillation mode may be designated by the symbol $$TE_{010}^{\infty\infty}$$

but in which the frequency is modified by a high permeability insert,

Fig. 3 is a perspective view of another resonator of this invention in which the oscillation mode has been so oriented by conductive end faces that the same may be designated by the symbol $$TM_{110}^{0\infty}$$

and in which a high permeability member has been inserted to modify the frequency of resonance, Fig. 4 is a perspective view of another resonator of this invention in which the oscillation mode has been so oriented by a conductive belt that the same may be designated by the symbol $$TE_{110}^{\infty 0}$$

and in which two high permeability members have been inserted to modify the frequency of resonance, Fig. 5 is a perspective view of a $$TE_{010}^{\infty\infty}$$

resonator of this invention disposed in frequency adjusting relation to a metallic frequency adjusting member, Fig. 6 is a perspective view of a $$TM_{110}^{0\infty}$$

resonator of this invention disposed in frequency adjusting relation to a metallic frequency adjusting member.

Fig. 7 is a perspective view of a $$TE_{110}^{\infty 0}$$

resonator of this invention disposed in frequency adjusting relation to a metallic frequency adjusting member, Fig. 8 is a perspective view of a resonator of this invention in which a closed core is employed which is provided with a magnetic biasing winding, Fig. 9 is a diagrammatic perspective view of a resonant discriminator employing input and output coupling coils and a $$TE_{010}^{\infty\infty}$$

resonator constructed in accordance with this invention.

Fig. 10 is a diagrammatic perspective view of a resonant discriminator employing input and output coupling coils and a $$TE_{110}^{\infty 0}$$

resonator of this invention,

Fig. 11 is a diagrammatic perspective view of a resonant discriminator employing a $$TM_{110}^{0\infty}$$

resonator of this invention, and

Fig. 12 is an elementary circuit diagram and diagrammatic mechanical layout of a channel selector of this invention employing a series of resonators of this invention.

The resonators of this invention, as previously noted, consist of solid bodies within which oscillations of a strictly electro-magnetic nature are entirely housed and held captive by naked or partly naked non-conducting exterior surfaces. To differentiate such resonators from cavities with complete metal boundaries as heretofore known and to avoid confusion I prefer to designate such by the term, dielectric solid resonators or more simply, "dielectric resonators" Where substances with dielectric constants of high order, such as are obtainable with ceramic titanates and stannates, are employed, a dielectric resonator having an oscillation mode $$TE_{010}^{\infty\infty}$$

may be constructed as shown in Fig. 1. As appears in Fig. 1, a cylindrical or disc-like body of dielectric substance 1 is provided. The dielectric constant of the body 1 is about about 10 and preferably is in the neighborhood of 3000 to 4000 or higher and the dielectric loss is preferably low. Any of the well-known high "K," high "Q" titanates, or stannates serve well for this purpose.

Where a magnetic field aligned with the axis of the body 1 is rapidly increased, circumferential displacement currents in the body 1, aligned with concentric shell surrounding the axis are established, building dielectric stress in proportion to the rate of change of the field. Upon cessation of change in the magnetic field these displacement currents are oppositely discharged, giving rise to their own opposite magnetic field also aligned with the axis of the body 1. With given dimensions and a given dielectric constant the body 1 will exhibit a specific critical resonant response.

To facilitate the establishment of the magnetic field in a dielectric resonator of this invention, having the $$TE_{010}^{\infty\infty}$$

mode, it is feasible to provide a low reluctance central path. This may be done, as shown in Fig. 2, by providing a non-conducting body 2 composed of high K substance, in annular form, surrounding a central axial hole, occupied by a core 3 of ferromagnetic substance of high permeability such as powdered iron or compositions such as "ferrite." Such a core will lower the resonant frequency.

A dielectric resonator, oscillating in the mode $$TM_{110}^{0\infty}$$

may be constructed in accordance with this invention in the form appearing in Fig. 3. In this case, a body 4 of high K, high Q material is provided with naked sides and metal coated end faces 5, 6. A central transverse opening housing a rod 7 of high permeability material may be provided for tuning purposes or not as desired.

A further mode of oscillation may be provided in a dielectric resonator constructed in accordance with this invention as shown in Fig. 4. In this case, the mode is $$TE_{110}^{\infty 0}$$

and this mode is furnished by a body 8 having naked end faces and metallic conductive side surfaces 9. The body 8 again is constructed of high K, high Q material and if desired openings occupied by high permeability rods 10 may be employed.

The modes of oscillation herein referred to are designated as to the main terminology "TE" and "TM" and as to the subscripts employed, in conformity with accepted published practices, as for example, as noted in "Radiation Laboratory Series," volume 11, page 297, McGraw-Hill Book Co. The introduction of superscripts is not in accordance with practices heretofore published since previous authors have dealt only with so-called cavities having metallic end walls and side walls as well, in which the boundary impedance on all sides is assumed zero. There has therefore been no previous occasion for the use of the superscripts herein employed. The first such superscript indicates herein, the impedance, zero or infinite, for the end faces of the dielectric resonator, while the second superscript designates the impedance of the side walls.

Of particular interest (even though the dielectric resonators of this invention are not limited thereto) are certain modes of oscillation which this invention can produce as substantial realities but which have heretofore been considered as impossible. Heretofore, only TM modes have been regarded as realizable in degenerate form. This viewpoint has been based upon a supposition of a space completely surrounded by conductive metal. Where these conditions are imposed, i.e. $n=0$, it is evident that there can be no realizable degenerated mode which is not designated TM. With the introduction of naked walls or end surfaces with infinite-impedance boundary conditions, the modes $$TM_{110}^{0\infty}$$

(see Fig. 3)

$$TE_{010}^{\infty\infty}$$

(see Fig. 2) and $$TE_{110}^{\infty 0}$$

(see Fig. 4), all become substantially realizable. Because of inherent magnetic leakage a slight dependence upon axial dimension may be apparent. The typical cavity mode $$TM_{010}^{00}$$

may also be obtained of course, by completely coating a cylinder of high K high Q material.

Where metal coatings are employed in any dielectric resonator of this invention, intimate bonding of the metal to the dielectric is of course essential for the realization of zero boundary impedance.

In order to point to the advantages of the dielectric resonator of this invention it is noted that the apparatus of this invention as shown in Fig. 3, if constructed of a dielectric having a K of about 2000 and a Q of about 100, with a diameter not greater than 1 inch, its resonant frequency will be about 150 megacycles and even without the rod 7 about 200 megacycles. This would compare with a so-called "cavity" upwards of 30 inches in length.

The hole provided for the insertion of the magnetic slug (of "ferrite" or powdered iron) when employed is preferably positioned where the magnetic field is strongest and the electric field very weak or zero. The electric field configuration is thus not influenced perceptibly. To illustrate: Fig. 2 represents a $$TE_{010}^{\infty\infty}$$

mode. The dielectric resonator is a dielectric cylinder without any metalization. The electric field encircles the axis of the dielectric cylinder, the magnetic field is parallel to the axis of the dielectric cylinder and strongest about the axis. The most favorable location for the introduction of a magnetic slug is therefore along the axis. The slug 3 and body 2 may be replaced by a body 28 and a closed magnetic ring 29, the permeability of which can be changed by using a coil 30 fed by direct or alternating excitation current influencing saturation for the purpose of tuning or modulation, as shown in Fig. 8. In the case of Fig. 4, which depicts a $$TE_{110}^{\infty 0}$$

mode where the periphery of the cylindrical dielectric body is metalized, and the mode represents a reversal of the $$TM_{110}^{0\infty}$$

mode shown in Fig. 3, the rods 10—10 are placed accordingly.

An instance, illustrative of one manner of use of a dielectric resonator of this invention and illustrative of a novel coupling device of this invention, is shown in Fig. 9. In this case the dielectric resonator 11 is employed as a part of a discriminating coupler, fed by an input coupling coil 12. Positioned close to the opposite face of the resonator 11 is an output coil 14. Interposed grounded screens 13 and 15 act to eliminate any substantial capacitive coupling between the coils 12 and 14.

Direct coupling between 12 and 14 is very slight, but if the dielectric resonator 11 is excited at its resonant frequency, output therefrom at that frequency will influence the coil 14. In this way a selected frequency from a group of frequencies, prevailing in coil 12, may be separated and delivered into the output coil 14.

In the event a discriminating coupler is to be constructed using a $$TE_{110}^{\infty 0}$$

mode, dielectric resonator such as is shown in Fig. 4, input coil 16 and output coil 17 may be related to the resonator 18 in the manner shown in Fig. 10. The disposition to be chosen for input and output coils 19 and 20 with respect to a $$TM_{110}^{0\infty}$$

mode, resonator 21 is shown in Fig. 11.

The resonant frequency of a dielectric resonator of this invention is subject to minor adjustment or "trimming" by an associated low impedance member which can be adjusted positionally as to proximity and attitude. For example, a metallic trimmer 22 equivalent to a short circuited secondary winding located with reference to a $$TE_{010}^{\infty \infty}$$

mode, dielectric resonator 23 as shown in Fig. 5, may be moved to and from the dielectric resonator 23 along the axis AB or may be rotated about the axis XY to increase or diminish the resonant frequency. In similar fashion the trimmer 24 may be adjusted with respect to the dielectric resonator 25 and the trimmer 26 adjusted with respect to the dielectric resonator 27. The dielectric resonators of this invention may also be modified in their action by application of biasing potential thereto. For example a direct current bias may be applied to the two end faces of the apparatus shown in Fig. 3. Electrodes may also be formed by interrupting the side surface coating of the apparatus of Fig. 4 or by imbedding radially disposed electrodes in the apparatus appearing in Figs. 1 and 2 which electrodes may also be biased by applied potential.

The modifying magnetic rods or cores 3, 7 and 10 may of course be brought back on themselves to form closed cores, if such is desired, whether or not windings or other means are employed to impose a magnetic bias thereon as is shown in Fig. 8. The holes provided for the insertion of the magnetic rods may also be used to admit other than magnetic substances or for the passage of particle streams or other beams or carriers of electric charges or concentrated magnetic fields of high frequencies. The dielectric resonators of this invention may thus be employed as parts of generators of oscillating currents by functioning as bunchers or catchers or both.

The dielectric resonators of this invention may also be placed in coupled relation to one another or to a tuned circuit of either the conventional lumped circuit type, or the metal enclosed cavity type to provide systems in which the frequency response is extended or subjected to shifting or to adjustment. For example, any one of the windings shown in Figs. 8, 9, 10 or 11 may be parts of tuned circuits of the lumped circuit type and the characteristics of such circuits will be influenced by the impedance transferred into them by said coupling.

Where the dielectric resonators of this invention are employed as discriminators as for example for the tuner of a television receiver a plurality of dielectric resonator bodies I, II, III, IV, V, etc. corresponding in resonance to the frequencies to be received are mounted in a mechanical transporting member 31 which may be manually shifted, indexed intervals as indicated at 32. Signal input is applied through an input amplifier 33 with its input coil 34 which acts through grounded screen 35 to excite the dielectric resonators I to V which may have been positioned opposite the coil 34. The excited dielectric resonator in question then acts through screen 36 to induce current in coil 38 of output amplifier 37 connected to the load.

The carrier 31 may conveniently be a rotatable disc of fairly small dimension formed of low K dielectric and may nevertheless be adequate to support a dozen or more dielectric resonators, any one of which may be selected by simply turning the disc.

The novel resonators of this invention are, as noted above, most conveniently made of ceramic-like materials containing titanates or stannates. The minerals effective for the purpose are usually artificially prepared in accordance with well-known procedures productive of substances having exceptional dielectric constants with comparatively low dielectric losses. The simple compact shapes of the resonators prepared from such substances renders the use of the same particularly advantageous when space saving is desired. In most instances it is desired that the properties of the dielectric employed be as nearly stable as possible in the face of changes of temperature, humidity, imposed load and production of noise is concerned. However, when desired, special compounds may be employed to measure changes in temperature, etc. in terms of changes in resonant frequency.

I claim:

1. An electromagnetic resonator comprising a cylindrical body of a solid dielectric substance having a high dielectric constant with conductive material intimately adhering to its side surfaces to provide a substantially zero impedance magnetic field confining surface, its end surfaces being bare to provide a substantially infinite impedance surface from which a magnetic field may enter and leave, and electromagnetic coupling means disposed to inductively couple to the magnetic field oriented by said zero and infinite impedance surfaces.

2. A resonator in accordance with claim 1 in which the dielectric body is pierced by a pair of spaced axial openings occupied by magnetic members.

3. An electromagnetic resonator in the form of an enclosure capable when excited by an inductively coupled electromagnetic field of housing an internally reflected electromagnetically propagated standing wave, comprising a solid body of dielectric substance having a dielectric constant greater than 10, said body having a covering for a portion only of the external surface of said body consisting of an intimately adhering low impedance substance to constitute for that part of the surface of the enclosure a magnetic field confining surface having reflective properties characteristic of a zero impedance surface, the remainder of the external surface of the body being bare to constitute a surface for the remainder of the enclosure having reflective properties characteristic of an infinite impedance surface from which a magnetic field may enter and leave, the extent of said bare surface being a substantial part of the entire surface of the body, and electromagnetic coupling means disposed to inductively couple to the magnetic field oriented by said zero and infinite impedance surfaces.

4. An electromagnetic resonator in the form of an enclosure capable when excited by an inductively coupled electromagnetic field of housing an internally reflected electromagnetically propagated standing wave, comprising a solid cylindrical body of dielectric substance having a dielectric constant greater than 10, said body having a substantial axial length and a resonant frequency determining diameter, a covering for the end faces of the body consisting of an intimately adhering low impedance substance to constitute for that part of the surface of the enclosure a surface having the reflective properties characteristic of a zero impedance surface and further constituting a magnetic field confining surface, the peripheral surface of the body being bare to constitute for the side surface of the enclosure a surface having reflective properties characteristic of an infinite impedance surface and further constituting a surface from which a magnetic field may enter or leave, the extent of said side surface being a substantial part of the surface of the body, and means for coupling by electromagnetic induction to a magnetic field oriented to enter and leave the body through the aforesaid infinite impedance surface.

5. A resonator in accordance with claim 3, wherein the dielectric body is pierced by a magnetic member positioned to encompass the locus of the maximum magnetic field occurring during oscillation to lower the resonant frequency of the body.

6. A resonator in accordance with claim 3 wherein the dielectric body is pierced by a magnetic member positioned to encompass the locus of the maximum magnetic field occurring during oscillation to lower the resonant frequency of the body and wherein the magnetic member is provided with a winding for applying a biasing magnetizing force thereto to vary its frequency modifying effect.

7. A resonator in accordance with claim 3 in which means are provided for applying a biasing potential thereto through the low impedance covering.

8. A resonator in accordance with claim 4 wherein the dielectric body is pierced by a transverse opening parallel to the end faces thereof, which opening is occupied by a magnetic member.

References Cited in the file of this patent
UNITED STATES PATENTS

| | | |
|---|---|---|
| 1,626,841 | Kelley et al. | May 3, 1927 |
| 2,129,711 | Southworth | Sept. 13, 1938 |
| 2,150,553 | Koch | Mar. 14, 1939 |
| 2,304,540 | Cassen | Dec. 8, 1942 |
| 2,406,402 | Ring | Aug. 27, 1946 |
| 2,473,556 | Wiley | June 21, 1949 |
| 2,512,945 | Kallmann | June 27, 1950 |
| 2,532,157 | Evans | Nov. 28, 1950 |
| 2,560,946 | Gossick | July 17, 1951 |
| 2,571,019 | Donley et al. | Oct. 9, 1951 |
| 2,611,094 | Rex | Sept. 16, 1952 |
| 2,639,324 | Harvey | May 19, 1953 |
| 2,645,758 | Van de Lindt | July 14, 1953 |
| 2,704,830 | Rosencrans | Mar. 22, 1955 |
| 2,711,515 | Mason | June 21, 1955 |
| 2,745,069 | Hewitt | May 8, 1956 |
| 2,752,495 | Kroger | June 26, 1956 |
| 2,754,481 | Hirsch | July 10, 1956 |

FOREIGN PATENTS

| | | |
|---|---|---|
| 976,767 | France | Nov. 11, 1950 |

OTHER REFERENCES

Fox et al.: Bell System Technical Journal, vol. 34, No. 1, January 1955, pages 5–103. (Copy in Scientific Library.)

UNITED STATES PATENT OFFICE
CERTIFICATE OF CORRECTION

Patent No. 2,890,422                                      June 9, 1959

Heinz M. Schlicke

It is hereby certified that error appears in the printed specification of the above numbered patent requiring correction and that the said Letters Patent should read as corrected below.

Column 2, line 50, for "member." read -- member, --; line 65, for "invention." read -- invention, --; column 3, line 17, for '"dielectric resonators"' read --"dielectric resonators". --; line 26, for "about", first occurrence, read -- above --.

Signed and sealed this 3rd day of November 1959.

(SEAL)
Attest:

KARL H. AXLINE                                             ROBERT C. WATSON

Attesting Officer                                         Commissioner of Patents